United States Patent [19]

Lajoie et al.

[11] Patent Number: 5,273,769
[45] Date of Patent: Dec. 28, 1993

[54] PROCESS FOR CROP PRODUCT PRESERVATION

[75] Inventors: M. Stephen Lajoie, Basking Ridge; Anthony E. Winston, East Brunswick, both of N.J.

[73] Assignee: Church & Dwight Co., Inc., Princeton, N.J.

[21] Appl. No.: 911,272

[22] Filed: Jul. 9, 1992

[51] Int. Cl.$^5$ ............................................. A23B 9/18
[52] U.S. Cl. .................................. 426/319; 426/320; 426/323; 426/331; 426/335; 426/532; 426/615; 426/616; 426/618; 426/626; 426/629
[58] Field of Search ............... 426/320, 319, 331, 335, 426/323, 442, 532, 616, 615, 618, 626, 629

[56] References Cited

U.S. PATENT DOCUMENTS

| | | | |
|---|---|---|---|
| 1,802,083 | 2/1929 | Legendre | 426/319 |
| 3,725,081 | 4/1973 | Barham et al. | 99/2 R |
| 4,199,606 | 4/1980 | Bland | 426/331 |
| 4,266,562 | 5/1981 | Merritt et al. | 131/273 |
| 4,335,148 | 6/1982 | Vidal et al. | 426/319 |

Primary Examiner—Helen F. Pratt
Attorney, Agent, or Firm—Charles B. Barris

[57] ABSTRACT

A method for preserving a harvested crop product contained in a storage enclosure. The method involves introducing carbon dioxide and ammonia gases into the storage enclosure to form an ammonium carbonate salt on the moist surfaces of the crop product. The ammonium carbonate salt exhibits pesticidal activity, and is effective for inhibiting fungus growth and preventing spoilage of the crop product.

12 Claims, No Drawings

PROCESS FOR CROP PRODUCT PRESERVATION

BACKGROUND OF THE INVENTION

Grains such as corn, wheat and sorghum are harvested in large quantities, and are stored prior to a subsequent conversion into products such as flour or molasses Harvested grains contain about 20-25% moisture, which is sufficient to promote fungus and mold growth and cause spoilage of the stored grain.

One method of preserving stored grain is by rapid drying of the grain with a stream of hot air to a moisture content below about 15%. This method has the disadvantage of a high energy cost.

Another method of preserving grain is by incorporation of about 1-2% of propionic acid. However, the treated grain has an objectionable taste and color, and the grain is limited to utility as animal fodder.

Other methods of treating bulk grain as a means of preventing spoilage involve the use of various gases which exhibit pesticidal activity when introduced into enclosed crop storage containers such as bins, elevators and freight cars.

Ammonia gas is an effective preservative when trickled through stored grain. The grain is discolored by the treatment, so that subsequent use is limited to animal consumption.

Sulfur dioxide gas also exhibits preservative effects on treated grain, but the gas adversely affects flavor, and the gas is highly corrosive to metal storage facilities.

Other harvested crop products such as fruits and vegetables similarly require protection against spoilage caused by fungus and other microorganisms during storage and long distance transportation. Lemons, oranges, grapefruit, melons, onions, tomatoes and potatoes are particularly susceptible to decay arising from microbial growth.

One effective method of preserving fruits and vegetables in storage is by treatment with nitrogen trichloride gas. The method requires critical control of the gas concentration to prevent damage to the treated product A serious disadvantage of nitrogen trichloride, and other preservative reagent gases such as chloride and chlorine dioxide, is high acidity in the presence of moisture, which is corrosive to metal storage equipment.

Methods and equipment for preserving stored crop products are described in U.S. Pat. Nos. 1,777,044; 2,715,582; 2,955,940; 4,078,480; 4,208,443; 4,209,538; 4,411,918; 4,421,774; 4,515,266; and references cited therein.

There is continuing interest in the development of new and improved methods for preventing spoilage of harvested agricultural crops during storage and transportation.

Accordingly, it is an object of this invention to provide a method of preserving a harvested crop product which is economical in practice and is long term effective.

It is another object of this invention to provide a method for inhibiting spoilage of a stored food crop which does not adversely affect the appearance and flavor of the crop product.

It is a further object of this invention to provide a method of preserving a newly harvested grain, fruit or vegetable crop in a storage enclosure, which in practice is harmless to the environment and maintains the crop product in a safe condition for human consumption.

Other objects and advantages of the present invention shall become apparent from the accompanying description and examples.

DESCRIPTION OF THE INVENTION

One or more objects of the present invention are accomplished by the provision of a process for preservation of a harvested crop product contained in a storage enclosure which comprises (1) introducing carbon dioxide into the storage enclosure in a concentration of at least about 2% by volume of the enclosed atmosphere; and (2) introducing ammonia into the carbon dioxide-containing storage enclosure in a concentration of at least about 2% by volume; wherein an ammonium carbonate salt is formed on the surfaces of the stored crop product and is effective for inhibition of fungus growth.

The concentration of carbon dioxide and ammonia respectively can be between about 5-50% by volume of the enclosed atmosphere, and the molar ratio of carbon dioxide:ammonia can be between about 0.5-5:1.

The crop typically is a newly harvested grain, fruit, vegetable, nut or seed product which undergoes an extended period of storage, handling and transportation before its eventual end use.

In another embodiment this invention provides a process for preservation of a harvested crop product contained in a storage enclosure which comprises introducing carbon dioxide and ammonia into the storage enclosure simultaneously in a carbon dioxide:ammonia molar ratio between about 0.5-5:1, wherein an ammonium carbonate salt is formed on the surfaces of the stored crop product and is effective for inhibition of fungus growth.

The storage enclosure which contains the harvested crop product is any of the storage bins, sheds, silos, transport vehicles, and the like, which are in general use in agricultural industries. A storage facility can be a plastic sheet covered crop product mound, or a plastic sheet enclosed rack structure, with auxiliary equipment for displacing the enclosed atmosphere with carbon dioxide and ammonia gases.

The carbon dioxide and ammonia gases interact with moisture on the surfaces of the stored crop product to form an ammonium salt deposit on the crop surfaces. The reaction proceeds rapidly and exothermally to form one or more salt compounds. Slower secondary reactions involving the formed salts also can occur, depending on the temperature, proportions of reactants, duration of storage period, and the like.

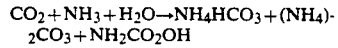

The formed salt reaction product is at least one of ammonium bicarbonate, ammonium carbamate, and ammonium carbonate.

The carbon dioxide and ammonia typically are charged to the crop storage enclosure in the form of gases. Optionally, the carbon dioxide and ammonia can be introduced in liquid or solid form with appropriate handling equipment. The alternative physical forms of the reactants can be convenient when storage enclosures such as transport vehicles are involved.

A newly harvested crop which is being stored usually has a sufficient moisture content for purposes of the present invention process, in which carbon dioxide and ammonia react with water to achieve the desired formation of ammonium carbonate salt. If the moisture content of the stored crop is not sufficiently high, or if the surfaces of the crop product are not suitably moist, then water can be introduced into the storage enclosure. The water can be provided before or during or after the introduction of the carbon dioxide and ammonia reactants into the crop storage enclosure.

It is an important aspect of the present invention that the carbon dioxide reactant is charged into the crop storage enclosure either before the ammonia reactant or not later than a simultaneous introduction with the ammonia reactant. If ammonia is charged to the crop storage enclosure before the carbon dioxide, then deleterious discoloration of the crop product occurs, and the product is unacceptable for human consumption.

In another embodiment this invention provides for the inclusion of between about 0.05–3 weight percent of ammonium carbonate salt additive in a harvested crop product contained in a storage enclosure, and the subsequent treatment of the stored crop product with carbon dioxide and ammonia gases.

In a further embodiment this invention provides for the inclusion of between about 0.01–2 weight percent of acidic reagent additive in a harvested crop product contained in a storage enclosure, and the subsequent treatment of the stored crop product with carbon dioxide and ammonia gases.

Illustrative of acidic reagent additives are water-soluble carboxylic acids such as citric acid; and inorganic compounds such as boric acid, magnesium nitrate, magnesium sulfate, and the like. The presence of the acidic reagent additive minimizes discoloration damage to the crop product caused by the potential build-up of excess ammonia in the crop storage enclosure.

The present invention process for preservation of a harvested crop product has many advantages in comparison with other preservation methods being practiced.

The carbon dioxide and ammonia reactants are readily available as inexpensive bulk commodities.

All of the process carbon dioxide, ammonia and ammonium carbonate salt chemicals are harmless to the environment, and non-corrosive to storage facilities.

The displacement of atmosphere when carbon dioxide and ammonia are introduced into the crop storage enclosure lowers the concentration of contained oxygen, ethylene and the like, and the gas displacement establishes a systemic environment for retarding spoilage and controlling the rate of crop maturation.

Both carbon dioxide and ammonia tend to inhibit fungus and mold growth, and the formed ammonium carbonate salt functions as fungicide under the invention process conditions.

The ammonium carbonate salt after formation exists in an equilibrium relationship with the carbon dioxide and ammonium reactants:

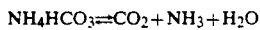

$$NH_4HCO_3 \rightleftharpoons CO_2 + NH_3 + H_2O$$

For this reason, the formation, decomposition, and reformation of ammonium carbonate salt in the equilibrium state is effective for promoting a complete permeation of the crop bulk in the storage enclosure. The formation of ammonium carbonate salt from carbon dioxide, ammonia and water also has the beneficial effect of reducing the moisture content of the storage enclosed crop product.

When a crop product is removed from storage after a present invention preservation treatment, the ammonium carbonate salt content is diminished gradually by decomposition until little or no residual salt content remains in the crop product. Notwithstanding, any residual ammonium carbonate salt is nontoxic and does not adversely affect the appearance and flavor of the crop product. Since the ammonium carbonate salt is soluble in water, if desired any residual salt can be removed readily by flushing the crop product surfaces with aqueous wash.

The following examples are further illustrative of the present invention. The components and specific ingredients are presented as being typical, and various modifications can be derived in view of the foregoing disclosure within the scope of the invention.

EXAMPLE I

This Example illustrates the preservation of whole grain sorghum in accordance with the present invention.

Whole grain sorghum (170 g) with a moisture content of 21% is placed in a sealed reactor (one liter), and the reactor is evacuated to subatmospheric pressure (10 mm Hg).

Carbon dioxide (3.6 g) is flashed into the reactor. After an elapsed period of two hours, ammonia (2.8 g) is flashed into the reactor. The temperature in the reactor increases about 5 degrees over a period of 20 minutes, and then returns to ambient temperature (68° F.).

Analysis indicates that the surfaces of the grain particles contain deposited ammonium bicarbonate.

The treated whole grain sorghum is transferred to a closed container which is maintained with simulated storage conditions. No evidence of fungus or mold is detected after a 100 day storage period.

Similar results are obtained if the whole grain sorghum is admixed with one gram of ammonium bicarbonate powder, prior to the treatment of the grain with carbon dioxide and ammonia gases.

Similar results are obtained if the whole gram sorghum is admixed with citric acid (0.5 gram), prior to the treatment of the grain with carbon dioxide and ammonia gases.

EXAMPLE II

This Example illustrates the preservation of freshly harvested peanuts in accordance with the present invention.

A batch of fresh peanut kernels (200 g) is placed in a sealed reactor (two liter), and the reactor is flushed with nitrogen.

A carbon dioxide gas stream is passed into the reactor until it has displaced 20% of the nitrogen atmosphere. After a two hour period, ammonia is flashed into the reactor until it has displaced 10% by volume of the reactor atmosphere. After two days of standing at ambient temperature, the contents of the reactor are removed.

The treated peanut kernel batch is transferred to a closed container which is maintained with simulated storage conditions. There is no evidence of *aspergillus flavus* formation after a 100 day storage period.

EXAMPLE III

This Example illustrates the preservation of citric fruit in accordance with the present invention.

A group of 15 cured yellow lemons is placed in a desiccator type receptacle. The air in the receptacle is displaced simultaneously with separate carbon dioxide and ammonia gas streams. The final container atmosphere by volume is 30% carbon dioxide, 25% ammonia and 45% air.

The treatment conditions are maintained for a period of 21 days. The average temperature is about 50° F., and the relative humidity is about 90–100%, during the treatment period.

Analysis indicates that the surfaces of the treated lemons contain a deposited mixture of ammonium bicarbonate and ammonium carbonate.

The lemons are attractive in appearance, and there is no visible evidence of decay. The lemons are firm, without rind or internal degradation.

EXAMPLE IV

This Example illustrates the preservation of rice grain in accordance with the present invention.

Following the procedure of Example II, dehulled whole rice grain (200 g) in a sealed reactor is perfused with successive gas streams of carbon dioxide (35% by volume) and ammonia (20% by volume).

After a treatment period of 20 hours, the rice gain batch is transferred to a closed container which is maintained with simulated storage conditions. After a 100 day storage period, there is no visible evidence of fungus or mold formation.

Similar results are obtained with treatment of fresh sunflower seeds.

What is claimed is:

1. A process for preservation of a harvested crop product suitable for human consumption which is contained in a storage enclosure, said process comprising (1) introducing carbon dioxide into the storage enclosure in a concentration of at least about 2% by volume of the enclosed atmosphere; and (2) subsequently introducing ammonia into the carbon dioxide-containing storage enclosure in a concentration of at least about 2% by volume; wherein an ammonium carbonate salt is formed on the surfaces of the stored crop product and is effective for inhibition of fungus growth; and wherein between about 0.01–2 weight percent of water-soluble acidic reagent is admixed with the crop product prior to preservation treatment to minimize discoloration damage to the crop product by the ammonia gas.

2. A process in accordance with claim 1 wherein the concentration of carbon dioxide and ammonia each is between about 5–50% by volume of the enclosed atmosphere, and the molar ratio of carbon dioxide:ammonia is between about 0.5–5:1.

3. A process in accordance with claim 1 wherein the formed ammonium carbonate salt comprises ammonium bicarbonate.

4. A process in accordance with claim 1 wherein the formed ammonium carbonate salt comprises ammonium carbamate.

5. A process in accordance with claim 1 wherein the formed ammonium carbonate salt comprises ammonium carbonate.

6. A process in accordance with claim 1 wherein the formed ammonium carbonate salt comprises a mixture of ammonium bicarbonate and ammonium carbonate.

7. A process in accordance with claim 1 wherein the surfaces of the crop product contain a quantity of moisture sufficient for ammonium carbonate salt formation.

8. A process in accordance with claim 1 wherein moisture is introduced into the storage enclosure for reaction with the carbon dioxide and ammonia to form the ammonium carbonate salt on the surfaces of the crop product.

9. A process in accordance with claim 1 wherein the crop product in the storage enclosure is in admixture with an ammonium carbonate salt additive.

10. A process in accordance with claim 1 wherein the crop product is a grain lot.

11. A process in accordance with claim 1 wherein the product is a fruit or vegetable lot.

12. A process in accordance with claim 1 wherein the product is a nut or seed lot.

* * * * *